(12) United States Patent
Xue et al.

(10) Patent No.: US 10,935,307 B2
(45) Date of Patent: Mar. 2, 2021

(54) LUMINOUS SOFA CUP HOLDER

(71) Applicant: OKIN Refined Electric Technology Co., Ltd, Zhejiang (CN)

(72) Inventors: Scott Xue, Zhejiang (CN); Peter Zhong, Zhejiang (CN); Sapu Li, Zhejiang (CN)

(73) Assignee: DewertOkin Technology Group Co., Ltd.

( * ) Notice: Subject to any disclaimer, the term of this patent is extended or adjusted under 35 U.S.C. 154(b) by 355 days.

(21) Appl. No.: 15/216,408

(22) Filed: Jul. 21, 2016

(65) Prior Publication Data

US 2017/0356686 A1  Dec. 14, 2017

(30) Foreign Application Priority Data

Jun. 12, 2016 (CN) .......................... 201610413868.3

(51) Int. Cl.
*F21V 33/00* (2006.01)
*F25D 27/00* (2006.01)
(Continued)

(52) U.S. Cl.
CPC .............. *F25D 27/005* (2013.01); *A47C 7/62* (2013.01); *A47C 7/622* (2018.08); *A47C 7/624* (2018.08);
(Continued)

(58) Field of Classification Search
CPC .... F25D 27/005; F25D 31/008; F25D 31/007; F25D 31/005; G02B 6/0096; A47C 7/62; A47C 7/54; A47C 20/00; A47G 23/02; A47G 19/2288; F21V 23/0442; F21V 33/0004; F21Y 2115/10; F21Y 2113/17;
(Continued)

(56) References Cited

U.S. PATENT DOCUMENTS 8,485,680 B2 * 7/2013 Anderson .............. B60N 3/108
224/926
8,786,200 B2 * 7/2014 Tischler ............. H05B 33/0827
257/98

(Continued)

FOREIGN PATENT DOCUMENTS

CN          203240454 U  * 10/2013
WO    WO-2015041058 A1 *  3/2015 .............. F25B 21/04

OTHER PUBLICATIONS

Espacenet English translation of CN 203240454 U.*

*Primary Examiner* — William J Carter
*Assistant Examiner* — Omar Rojas Cadima

(57) ABSTRACT

The present invention relates to a luminous sofa cup holder comprising the cup body, the mounting base for supporting the cup body, the light source, the cooling/heating module, the temperature sensor and the control circuit for detecting the temperature of the cup body, either directly or indirectly, wherein the cup body is provided with an empty cavity, wherein the edge of the upper opening of the empty cavity is a flanging structure, which protrudes on the outer side of the cup body, wherein the light source is disposed over the outer side of the cup body; wherein the mounting base is a hollow body provided with at least one opening; wherein the cup body inserts into the mounting base through the opening provided on the mounting base; wherein the light source is held tightly by the cup body and the mounting base.

14 Claims, 4 Drawing Sheets

(51) Int. Cl.
*A47C 7/62* (2006.01)
*F21V 8/00* (2006.01)
*A47C 20/00* (2006.01)
*F25B 21/04* (2006.01)
*F25D 31/00* (2006.01)
*F21Y 113/17* (2016.01)
*F21Y 115/10* (2016.01)
*F21V 23/04* (2006.01)
*F21W 131/301* (2006.01)

(52) U.S. Cl.
CPC .............. *A47C 20/00* (2013.01); *F25B 21/04* (2013.01); *F25D 31/005* (2013.01); *F25D 31/007* (2013.01); *F25D 31/008* (2013.01); *G02B 6/0095* (2013.01); *G02B 6/0096* (2013.01); *F21V 23/0442* (2013.01); *F21V 33/0004* (2013.01); *F21W 2131/301* (2013.01); *F21Y 2113/17* (2016.08); *F21Y 2115/10* (2016.08); *F25B 2321/0251* (2013.01)

(58) Field of Classification Search
CPC .............. F25B 21/04; F25B 2321/0251; A47J 2202/00; A47J 27/21041; A47J 31/4417; A47J 36/2461; A47J 41/0044; A47J 41/005; A47J 41/0094; B60N 3/104
See application file for complete search history.

(56) References Cited

U.S. PATENT DOCUMENTS

| | | | |
|---|---|---|---|
| 9,868,376 B2* | 1/2018 | Oh ........................ | B60N 3/104 |
| 9,919,632 B2* | 3/2018 | Oh ........................ | B60N 3/104 |
| 2002/0154511 A1* | 10/2002 | Verlage ................. | E05B 17/10 |
| | | | 362/487 |
| 2008/0068823 A1* | 3/2008 | Lim ....................... | A45B 3/04 |
| | | | 362/102 |
| 2012/0048708 A1* | 3/2012 | Salter .................... | H03K 17/96 |
| | | | 200/600 |
| 2015/0122688 A1* | 5/2015 | Dias ..................... | A47G 19/025 |
| | | | 206/459.1 |
| 2016/0137114 A1* | 5/2016 | Oh ........................ | F25B 21/04 |
| | | | 62/3.3 |
| 2016/0236605 A1* | 8/2016 | Doi ....................... | B60N 3/106 |

* cited by examiner

LUMINOUS SOFA CUP HOLDER

TECHNICAL FIELD OF THE INVENTION

The present invention relates to a luminous sofa cup holder, which can be installed in the armrest of a sofa.

BACKGROUND OF THE INVENTION

The luminous cup holder can emit light in the dark environment, enabling people to easily find the cup holder and place the cup or other goods into cup holder. In a further embodiment of the present invention, the goods inside the cup holder are illuminated by the cup holder. The luminous cup holder is usually installed in the armrest of the sofa or chair in a movie theater. The movie theater is dark during a movie. In the prior art, the light source is placed inside the cup body or at the upper opening of the cup holder. However, when the light source is placed inside the cup body, the emitted light is diminished or blocked, resulting in poor illumination. Consequently, one cannot recognize the light source clearly from a distance. Additionally, if the light source is placed at the upper opening of the cup body, the glaring light emits directly into the eyes of the person attempting to pick her cup or goods from the cup holder.

Moreover, the traditional cooling/heating cup holder fails to display the working condition during the cooling/heating process. Consequently, the user must test the temperature of the cup herself, which is inconvenient and possibly dangerous, depending on the temperature of the contents in the cup.

SUMMARY OF THE INVENTION

The purpose of the present invention is to overcome the shortcomings in the prior art and provide a luminous cup holder for an item of a furniture like a sofa, a recliner, a chair, a bed, a desk or a table, having the advantages of an efficient design structure with an illumination and is easy to install. A further embodiment of the present invention is to provide a cup holder which involves an easy temperature-recognition.

To achieve the above purpose, the present invention adopts the following technical solution:

According to one aspect of the present invention, the luminous cup holder, comprises the cup body; the mounting base for supporting the cup body; the light source; the cooling/heating module; the temperature sensor and the control circuit for detecting the temperature of the cup body directly or indirectly; wherein the cup body is provided with an empty cavity; wherein the edge of the upper opening of the empty cavity is a flanging structure, which protrudes on the outer side of the cup body; wherein the light source is disposed over the outer side of the cup body; wherein the mounting base is a hollow body provided with at least one opening; wherein the cup body inserts into the mounting base through the opening provided on the mounting base; wherein the light source tightly held by the cup body and the mounting base; wherein the cooling/heating module is disposed at the lower end of the cup body and fixed to the cup body; wherein the cooling/heating module provides a thermal source for heating or cooling the cup body; wherein the control circuit connects to a temperature sensor; wherein the control circuit receives the detecting signal from the temperature sensor and issues an order to the light source according to the detecting signal from the temperature sensor.

In another aspect of the present invention, the cup body comprises the upper cup body and the cup stand, wherein the cup stand is fixed to the lower end of the upper cup body.

In another aspect of the present invention, the edge of the opening of the mounting base is a flanging structure, wherein the light source is disposed between the cup body flanging and the mounting base flanging.

In another aspect of the present invention, a plurality of recessed locating slots are vertically disposed on the inner wall of the mounting base from top to bottom; wherein a plurality of convex locating bars installed correspondingly to the plurality of locating slots are disposed on the outer side of the cup body; or, wherein a plurality of convex locating slots are vertically disposed on the inner wall of the mounting base from top to bottom; wherein a plurality of recessed locating bars installed correspondingly to the plurality of locating slots is disposed on the outer side of the cup body.

In another aspect of the present invention, the light source comprises the luminous body and the light pipe; the light pipe is an annular structure; the luminous body is disposed at the two ends of the light pipe; the luminous body comprises a plurality of surface mounting LEDs, which are disposed back-to-back.

The arrangement of the at least one LED embodies the light source. As a further embodiment of the light pipe, the light pipe is made of one part. As an alternative design of the light pipe it comprises a plurality of light pipe segments. All kind of light pipe takes the illumination generated by the at least one LED to carry the illumination to its destination.

In another aspect of the present invention, the light source comprises the luminous body and the light pipe; wherein the light pipe further comprises the main body of the light pipe and the extended body of the light pipe installed correspondingly to the luminous body; wherein one end of the extended body of the light pipe connects to the main body of the light pipe and the other end of the extended body of the light pipe is provided with the luminous body; wherein the main body of the light pipe and the extended body of the light pipe are placed in different horizontal planes; wherein the main body of the light pipe is an annular structure.

In another aspect of the present invention, the cup body and the mounting base are hollow cylinder-shaped; wherein the light source is disposed in annular shape.

In another aspect of the present invention, the cup body and the mounting base are hollow cylinder-shaped; wherein the light source is disposed in annular shape.

In another aspect of the present invention, the temperature sensor is disposed on the inner wall of the cooling module or the cup body.

In another aspect of the present invention, the temperature sensor is the thermistor. Further embodiments of temperature sensors of the present invention are a semiconductor, or a diode, or a thermal element, or a resistor. In general, the electric output signal or the electric character of the temperature sensor may vary in response to the detected heat.

In another aspect of the present invention, the cooling/heating module comprises the thermoelectric cooler, the heat sink and the heat insulating layer; wherein one side of the thermoelectric cooler is closed tightly to the heat sink, and the other side of the thermoelectric cooler is covered with the heat insulating layer; wherein the heat insulating layer is disposed between the thermoelectric cooler and the cup stand; wherein the heat dissipation fins are fixed to the cup stand.

In another aspect of the present invention, the light source comprises at least one but in a further embodiment a plurality of light emitting diodes. Such light emitting diodes are called by the present invention as LED.

In another aspect of the present invention, the luminous body is a RGB three-colored LED.

In another aspect of the present invention, the light source generates at least one color. For easily lighting the cup holder is a white light color used. A further embodiment of the light source LED is designed as a so called RGB light emitting diodes like a three-colored LED which is able to generate a plurality of light colors. In another aspect of the present invention, the control circuit controls the light color of the RGB three-colored LED according to the detecting signal from the temperature sensor. Both the at least one LED and the temperature sensor are connected by a conductive pathway to its control circuit.

In another aspect of the present invention, the control circuit controls the number of lighted LEDs also the number of RGB LEDs according to the detecting signal from the temperature sensor.

The control circuit is able to control the LED by switching the LED on or off or by controlling its brightness. If there is a RGB LED used by the cup holder, the control circuit is able to control the light color additionally in such a way, that a first temperature range corresponds to a first color light and a second temperature range corresponds to a second color light. In such inventive step the user is able to detect the temperature casually and can follow up a movie or conservation. The cup holder provides the information very comfortable to the user whether inside the cup holder it's hot or it's cold easily. A bluish color represents a cold temperature and a deep blue represents a very cold temperature. A reddish color represents a warm temperature and a strong red represents a hot temperature.

In another aspect of the present invention, the cup holder further comprises a fan, and the fan is disposed underneath the heat sink. The fan is designed as a first embodiment of a heat dissipation device which is installed in relation to the heating/cooling module. The dissipation device is provided to transport heat in relation to the heating/cooling module.

A very easy embodiment of a heating/cooling module comprises a number of Peltier elements as known by prior art. Each Peltier element has one section to generate and transmit heat and a further section to generate and transmit cold depending on the polarity of the DC voltage inside the cup holder. So depending on the polarity it's possible to run the cup holder as a cooling cup holder to generate a cold inside the cup holder or as a heating cup holder to generate heat inside the cup holder. One aspect of the present invention takes one control circuit to control both the heating/cooling module and the light source. A further aspect of the present invention takes a plurality of control circuits. So it's possible to run the heating/cooling module by a switch operate by the user, whereby the control circuit is connected to the switch. The polarity and the supply voltage of the heating/cooling module is controlled by the control circuit. In addition, the illumination of the cup holder is operable by the user, too, whereby the control circuit comprises the illumination switch.

In one aspect of the present invention the control circuit comprises a micro controller to control the heating/cooling module and/or to control the light source and the light color for illumination. In a further embodiment the at least one control circuit is designed as a discrete circuit using at least one transistor. In addition, a potential divider could be useful, too. A comparator could be integrated, too. So the electric signal of the thermal sensor depends on the current temperature inside the cup holder and provides the input signal to the at least one transistor. The at least one transistor provides an electric output signal to provide the at least one LED to generate at least one light color and/or at least one brightness of at least one light color. In a first embodiment of the LED, the LED has two electrical connections and generates different light colors depending on its input signal. A further embodiment of the LED takes more than to electric connectors to generate different light colors by input corresponding voltage signals by the at least one transistor. Further the potential divider generates different signal potentials to run the LED. As an alternative there is at least one further transistor additionally to generate in sum together with the first transistor different voltage signals to provide the LED for generating different light colors and/or different light brightness.

In another aspect of the present invention, the thermoelectric cooler comprises at least two pieces, and each piece is overlapped onto another piece.

Compared with the prior art, the present invention is characterized by the following advantages:

The light source of the present invention is disposed in a circumferential direction of the cup body so that one can quickly recognize the location of the seat and the cup holder from a distance. When placing the cup or goods, the light emitted by the light source is soft and comfortable, protecting the eyes from glaring, direct light.

The assembly of the present invention is very easy: the mounting base for supporting and installing the cup body is disposed in the armrest of the sofa.

The assembly of the cup body and the mounting base adopts a combined design, which is easy to maintain.

The present invention further comprises the cooling/heating module, providing the cooling/heating function to the luminous cup holder.

The present invention comprises further an item of furniture having a cup holder as described. Such item of furniture could be embodied by a sofa or by a bed or by a chair or by a desk or by a table or by a cinema chair. It is possible to install the inventive cup holder to all kind of furniture, because the cup holder is designed as a compact and robust module and can be easily mounted for example in an arm of a sofa or chair or for example in a table top or a table surface of a sofa element or of a working desk.

DETAILED DESCRIPTION OF THE INVENTION

Drawings and detailed embodiments are combined hereinafter to elaborate the technical principles of the present invention. The description is intended to illustrate, but not to limit the protective scope of the present invention in any way. Based on the detailed description herein, those skilled in the art can associate themselves with other particular embodiments without paying creative labor. Thus, these embodiments shall all fall within the protective scope of the present invention.

Figure 1:
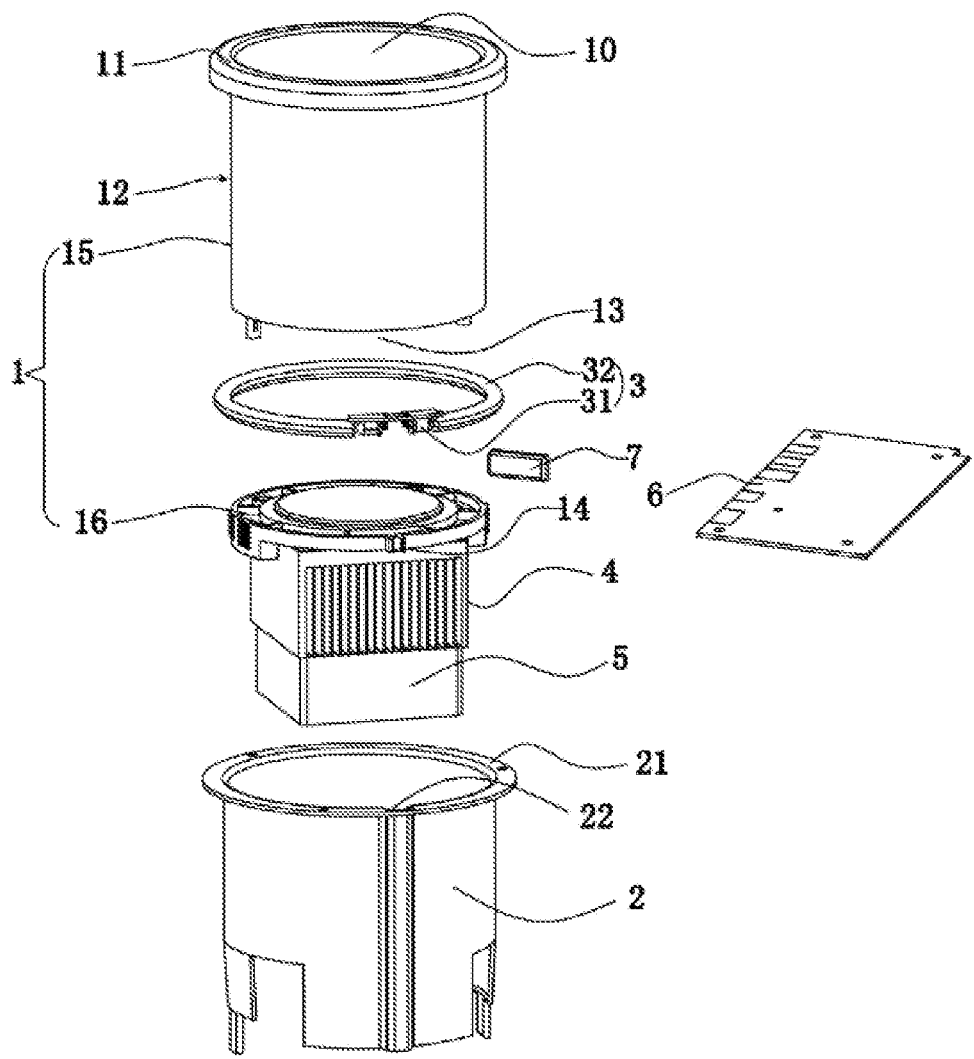
FIG. 1 is a structure diagram of the embodiment of the present invention.

As shown in FIG. 1, the exemplary luminous cup holder is designed to install in a sofa of the embodiment comprises the cup body 1, the mounting base 2 for supporting the cup body, the light source 3, the cooling/heating module 4, the temperature sensor 7 and the control circuit 5 for detecting the temperature of the cup body directly or indirectly; the cup body 1 is provided with an empty cavity, which is a storage space; the edge of the upper opening 10 of the empty cavity is a flanging structure 11, which protrudes on the outer side 12 of the cup body; the light source 3 is disposed over the outer side 12 of the cup body; the mounting base 2 is a hollow body provided with at least one opening; the cup body 1 inserts into the mounting base 2 through the opening provided on the mounting base 2; the light source 3 is held tightly by the cup body 1 and the mounting base 2; the cooling/heating module 4 is provided at the lower end 13 of the cup body and fixed to the cup body 1; the cooling/heating module 4 provides a cold source/heat source to the cup body 1; the control circuit 5 connects to the temperature sensor 7; the control circuit 5 receives the detecting signal from the temperature sensor 7, and issues an order to the light source 3 according to the detecting signal from the temperature sensor 7. The cooling/heating module 4 provides the cooling/heating process to the goods placed in the cup body 1.

The light source 3 of the embodiment comprises a plurality of light emitting diodes. The control circuit 5 controls the number of the lighted light emitting diodes according to the detecting signal from the temperature sensor 7. Usually, a greater amount of LEDs that are emitting light reflect a greater deviation from the room temperature.

The cup body 1 and the mounting base 2 of the embodiment are hollow cylinder-shaped; the light source 3 is annular-shaped. The cup body 1, the mounting base 2 and the light source 3 are all circular-shaped, an arrangement which is convenient for assembly.

The cup body 1 of the embodiment comprises the upper cup body 15 and the cup stand 16; the cup stand 16 is fixed to the lower end of the upper cup body 15.

The edge of the opening of the mounting base 2 is provided with a mounting base flanging 21; the light source 3 is disposed between the cup body flanging 11 and the mounting base flanging 21, providing a larger stressed area to the cup body flanging 11 and the mounting base flanging 21. The external diameter of the cup body flanging 11, the mounting base flanging 21 and the light source 3 are essentially the same so that the appearance of the cup holder is aesthetically attractive. The cup body flanging 11 and the mounting base flanging 21 protect the light source 3 from the side impact.

In the embodiment, a plurality of recessed locating slots 22 is vertically provided on the inner wall of the mounting base from top to bottom. A plurality of convex locating bars 14 installed correspondingly to the plurality of locating slots 22 is disposed on the outer side 12 of the cup body. In another solution of the embodiment, the position of the locating slots 22 and the locating bars 14 corresponding to the mounting base 2 and the cup body 1 can be exchanged. Namely, a plurality of convex locating slots 22 is vertically disposed on the inner wall of the mounting base from top to bottom; a plurality of recessed locating bars 14 installed correspondingly to the plurality of locating slots 22 is disposed on the outer side 12 of the cup body. The locating slot 22 is coupled to the locating bar by this recessed-convex structure, confining the rotation of the cup body 1 and the mounting base 2 in a circumferential direction. The locating bar 14 of the embodiment is disposed on the cup stand 16.

Figure 2:
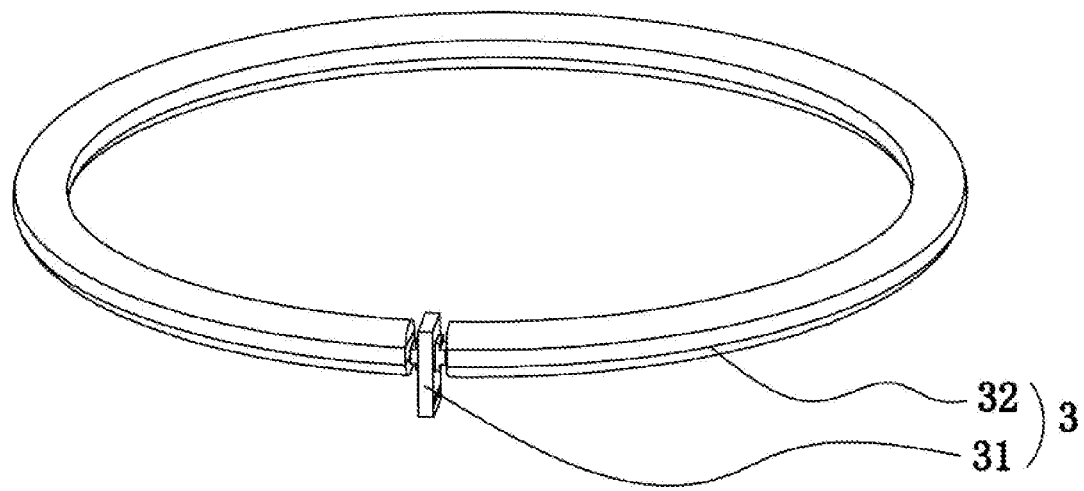
FIG. 2 is a structure diagram of the light source of the present invention.

As shown in FIG. 2, the light source 3 of the embodiment comprises the luminous body 31 and the light pipe 32; the light pipe 32 is annular-shaped; the luminous body 31 is disposed at the two ends of the light pipe 32; the luminous body 31 comprises the surface mounting LEDs, which are disposed back-to-back. The thickness of the LED is very small so that the illumination of the light pipe 32 in the circumference direction is basically same and produces very little shadow.

Figure 3:
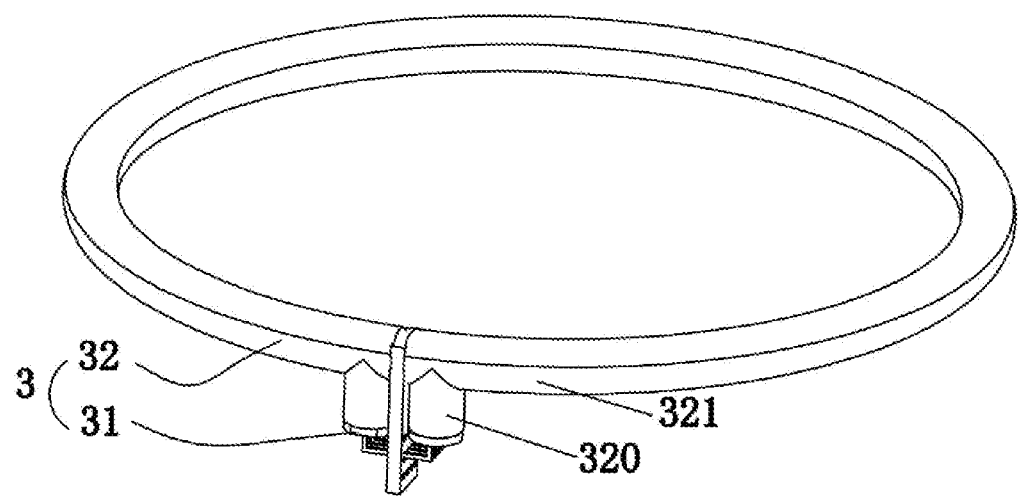
FIG. 3 is another structure diagram of the light source of the present invention.

As shown in FIG. 2 at least two SMD LEDs are used, which have a very small thickness and which embodies the light source. The luminous body 31 comprises a circuit board. A further embodiment of the light pipe 32 has recesses on the front side of the end of the light pipe 32. Each recess is arranged next to the LED thus the LED is placed to the recess. The advantageous effect is to reduce the shadow caused by the As shown in FIG. 3, in another solution of the light source 3 of the embodiment, the light source 3 comprises the luminous body 31 and the light pipe 32; the light pipe 32 further comprises the main body 321 of the light pipe and the extended body 320 of the light pipe corresponding to the luminous body 31; one end of the extended body 320 of the light pipe connects to the main body 321 of the light pipe and the other end of the extended body 320 of the light pipe is provided with the luminous body 31; the main body 321 of the light pipe and the extended body 320 of the light pipe are placed in different horizontal planes; the main body 321 of the light pipe is an annular structure; the luminous body 31 is an LED; this structure allows the light pipe 32 to emit light in the circumferential direction uniformly and without creating a shadow.

Figure 4:
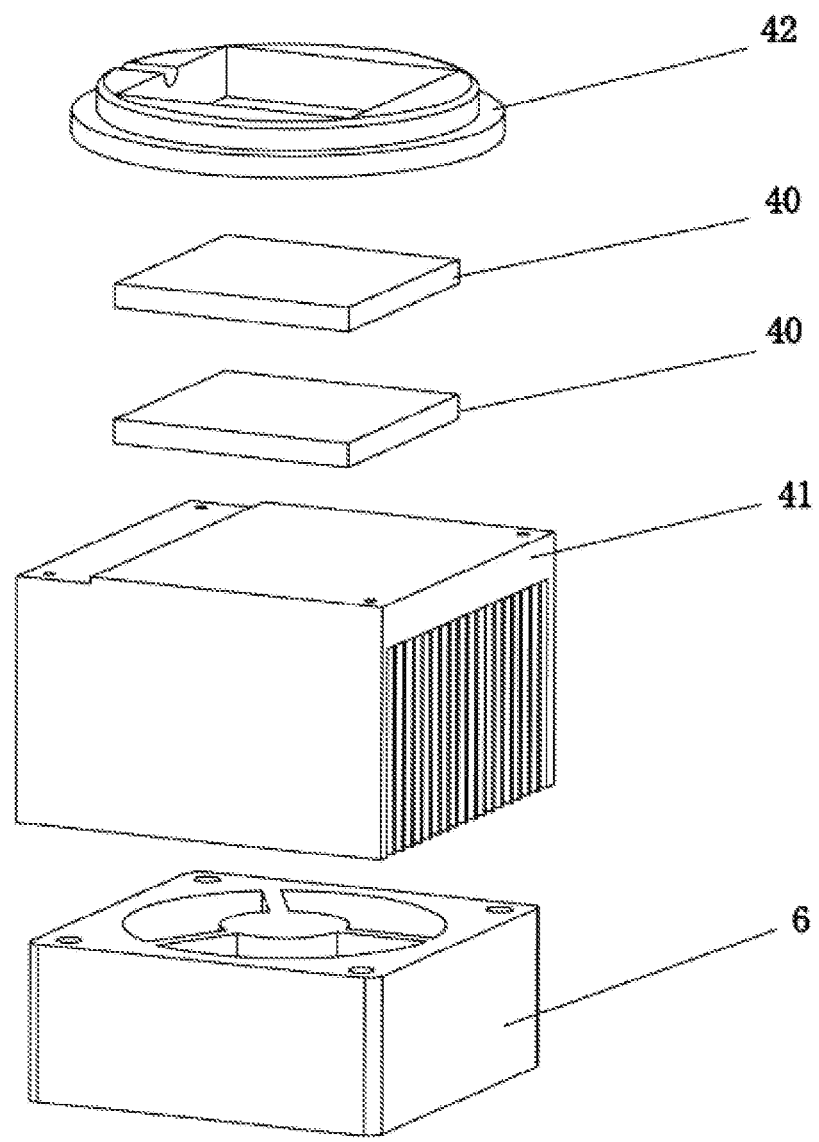
FIG. 4 is a structure diagram of the cooling/heating module of the present invention.

As shown in FIG. 4, the cooling/heating module 4 of the embodiment comprises the thermoelectric cooler 40, the heat sink 41 and the heat insulating layer 42; one side of the thermoelectric cooler 40 is closed tightly to the heat sink 41, and another side is covered with the heat insulating layer 42; the heat insulating layer is disposed between the thermoelectric cooler 40 and the cup stand 16; the heat sink 41 is fixed to the cup stand 16. The thermoelectric cooler 40 is also called the thermoelectric semiconductor refrigeration components, Peltier, Peltier-element, etc. The thermoelectric cooler 40 has two sides, with one side for absorbing heat and another side for dissipating heat, which functions as a thermal conductor. By switching the negative electrode and the positive electrode, the heat-absorbing side and the heat-dissipating side can be altered.

The embodiment further comprises the fan 6, which is disposed underneath the cooling/heating module 4, improving the heat dissipation performance and enhancing the whole cooling/heating effect.

The thermoelectric cooler 40 has at least two pieces; each piece is overlapped onto another piece. This structure is helpful for improving the whole cooling/heating effect.

As described, a further embodiment of the present invention takes further features.

As shown in FIG. 1, the luminous sofa cup holder of the embodiment comprises the cup body 1, the mounting base 2 for supporting the cup body, the light source 3, the cooling/heating module 4, the temperature sensor 7, and the control circuit 5 for detecting the temperature of the cup body directly or indirectly; the cup body 1 is provided with an empty cavity, which is a storage space; the edge of the upper opening 10 of the empty cavity is a flanging structure 11, which protrudes on the outer side 12 of the cup body; the light source 3 is disposed over the outer side 12 of the cup body; the mounting base 2 is a hollow body provided with at least one opening; the cup body 1 inserts into the mounting base 2 through the opening provided on the mounting base 2; the light source 3 is held tightly by the cup body 1 and the mounting base 2; the cooling/heating module 4 is provided at the lower end 13 of the cup body and fixed to the cup body 1; the cooling/heating module 4 provides cold source/heat source to the cup body 1; the control circuit 5 connects to the temperature sensor 7; the control circuit 5 receives the detecting signal from the temperature sensor 7 and issues an order to the light source 3 according to the detecting signal from the temperature sensor 7. The cooling/heating module 4 provides cooling/heating process to the goods placed in the cup body 1.

The cup body 1 and the mounting base 2 of the embodiment are hollow cylinder-shaped; the light source 3 is annular-shaped. The cup body 1, the mounting base 2 and the light source 3 are all circular-shaped, an arrangement which is convenient for assembly.

The cup body 1 of the embodiment comprises the upper cup body 15 and the cup stand 16; the cup stand 16 is fixed to the lower end of the upper cup body 15.

The edge of the opening of the mounting base 2 is provided with a mounting base flanging 21; the light source 3 is disposed between the cup body flanging 11 and the mounting base flanging 21, providing a larger stressed area to the cup body flanging 11 and the mounting base flanging 21. The external diameter of the cup body flanging 11, the mounting base flanging 21 and the light source 3 have a similar appearance, so that the cup holder is aesthetically attractive. The cup body flanging 11 and the mounting base flanging 21 protect the light source 3 from the side impact.

In the embodiment, a plurality of recessed locating slots 22 is vertically provided on the inner wall of the mounting base from top to bottom. A plurality of convex locating bars 14 installed correspondingly to the plurality of locating slots 22 is disposed on the outer side 12 of the cup body. In another solution of the embodiment, the position of the locating slots 22 and the locating bars 14 corresponding to the mounting base 2 and the cup body 1 can be exchanged. Namely, a plurality of convex locating slots 22 is vertically disposed on the inner wall of the mounting base from top to bottom; a plurality of recessed locating bars 14 installed correspondingly to the plurality of locating slots 22 is disposed on the outer side 12 of the cup body. The locating slot 22 is coupled to the locating bar by this recessed-convex structure, inhibiting the rotation of the cup body 1 and the mounting base 2 in circumferential direction. The locating bar 14 of the embodiment is disposed on the cup stand 16.

As shown in FIG. 2, the light source 3 of the embodiment comprises the luminous body 31 and the light pipe 32; the light pipe 32 is annular-shaped; the luminous body 31 is disposed at the two ends of the light pipe 32; the luminous body 31 comprises the surface mounting LEDs, which are disposed back-to-back. The thickness of the LED is very small so that the illumination of the light pipe 32 in the circumference direction is basically same and nearly produces no shadow.

As shown in FIG. 3, in another solution of the light source 3 of the embodiment, the light source 3 comprises the luminous body 31 and the light pipe 32; the light pipe 32 further comprises the main body 321 of the light pipe and the extended body 320 of the light pipe installed correspondingly to the luminous body 31; one end of the extended body 320 of the light pipe connects to the main body 321 of the light pipe and the other end of the extended body 320 of the light pipe is provided with the luminous body 31; the main body 321 of the light pipe and the extended body 320 of the light pipe are placed in different horizontal planes; the main body 321 of the light pipe is an annular structure; the luminous body 31 is an LED; this structure has advantages that the light pipe 32 can emit light in the circumference direction uniformly and shadow-free.

As shown in FIG. 4, the cooling/heating module 4 of the embodiment comprises the thermoelectric cooler 40, the heat sink 41 and the heat insulating layer 42; one side of the thermoelectric cooler 40 is closed tightly to the heat sink 41, and another side is covered with the heat insulating layer 42; the heat insulating layer is disposed between the thermoelectric cooler 40 and the cup stand 16; the heat sink 41 is fixed to the cup stand 16. The thermoelectric cooler 40 is also called thermoelectric semiconductor refrigeration components, Peltier, etc. The thermoelectric cooler 40 has two sides, with one side for heat absorption and another side for heat dissipation, which serves as thermal conductor. Switching the negative electrode and the positive electrode, the heat-absorbing side and the heat-dissipating side can be changed.

The embodiment further comprises the fan 6, which is disposed underneath the cooling/heating module 4, improving the heat dissipation performance and enhancing the whole cooling/heating effect.

The thermoelectric cooler 40 has at least two pieces; each piece is overlapped onto another piece. This structure is helpful for improving the whole cooling/heating effect.

Figure 5:
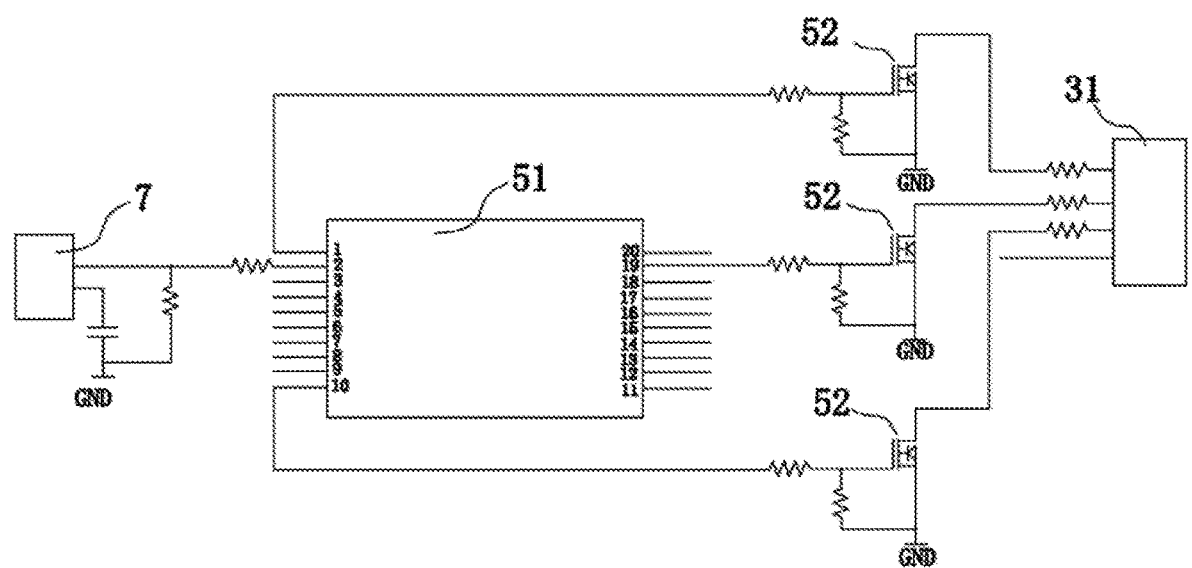
FIG. 5 is a structure diagram of the control circuit in embodiment 2 of the present invention.

As shown in FIG. 5, the luminous body of the embodiment is a RGB three-colored LED. The control circuit 5 controls the light color of the RGB three-colored LED according to the detecting signal from the temperature sensor 7. The control circuit 5 controls the light color of the RGB three-colored LED according to the temperature variation detected by the temperature sensor 7, giving a beautiful visual effect to the users. Compared with the traditional way of displaying temperature by digital tube, the present invention is more eye-catching and attractive.

The control circuit 5 of the embodiment comprises the stm8s series microcontroller 51 and the MOS pipe 52. The lead-foot 2 of the stm8s series microcontroller 51 connects to the temperature sensor 7; the lead-foot 1, 10, 19 of the stm8s series microcontroller 51 connects to the MOS pipe 52 respectively so as to drive the RGB three-colored LED. The thermistor is a kind of resistor that change its electric output signal according to differences in the detected temperature; the stm8s series microcontroller 51 continuously collects the earth voltage of the thermistor so as to master the temperature change; the stm8s series microcontroller 51 indirectly measures the temperature change through continuously detecting the voltage of the thermistor, and compares the voltage with the preset value so that the current of the RGB three-colored LED can be controlled by regulating the PWM duty ratio and realizes the automatic adjustment of the colors.

The previous descriptions are of preferred examples for implementing the invention, and the scope of the invention should not necessarily be limited by this description. The scope of the present invention is defined by the claims.

The invention claimed is:

1. A luminous sofa cup holder for an item of a furniture like a sofa, comprising:
    an upper cup body;
    a mounting base;
    a light source;
    a cup stand;

a cooling/heating module;

a temperature sensor for detecting the temperature of the upper cup body;

wherein the upper cup body further comprising a cup body flanging around an opening on top of the upper cup body;

wherein the mounting base further comprising a mounting base flanging around an opening on top of the mounting base;

wherein the light source; the mounting base flanging and the cup body flanging are annular shaped and have substantially the same outer diameters;

wherein the upper cup body inserts into the mounting base through an opening in middle of the light source; wherein the light source is disposed between the mounting base flanging and the cup body flanging;

wherein a cup stand is fixed directly to a lower end of the upper cup body; wherein the cup stand allows a cup to sit on top of the cup stand;

wherein the cooling/heating module is fixed to the cup stand; and wherein the cup stand is inserted into the mounting base.

2. The luminous sofa cup holder of claim 1, wherein a plurality of locating slots are vertically disposed on an inner wall of the mounting base from top to bottom; wherein a plurality of locating bars installed on an outer edge of the cup stand; wherein each locating slot corresponds to an locating bar.

3. The luminous sofa cup holder of claim 1, wherein the light source comprises a luminous body and a light pipe; the light pipe is an annular structure; the luminous body is disposed at two ends of the light pipe; the luminous body comprises a plurality of surface mounting LEDs.

4. The luminous sofa cup holder of claim 3, wherein the upper cup body and the mounting base are hollow cylinder-shaped.

5. The luminous sofa cup holder of claim 3, wherein the luminous body is a RGB three-colored LED.

6. The luminous sofa cup holder of claim 5, wherein a control circuit controls the light color of the RGB three-colored LED according to the detecting signal from the temperature sensor.

7. The luminous sofa cup holder of claim 1, wherein a temperature sensor is disposed on an inner wall of the cooling/heating module.

8. The luminous sofa cup holder of claim 7, wherein the temperature sensor is a thermistor.

9. The luminous sofa cup holder of claim 1, wherein the cooling/heating module comprises a thermoelectric cooler, a heat sink and a heat insulating layer; wherein one side of the thermoelectric cooler is closed tightly to the heat sink, and the other side of the thermoelectric cooler is covered with the heat insulating layer; wherein the heat insulating layer is disposed between the thermoelectric cooler and the cup stand; wherein the heat dissipation fins are fixed to the cup stand.

10. The luminous sofa cup holder of claim 9, wherein the cup holder further comprises a fan, and the fan is disposed underneath the heat sink.

11. The luminous sofa cup holder of claim 9, wherein the thermoelectric cooler has two sides, wherein one side of the thermoelectric cooler absorbs heat and the other side dissipates heat.

12. The luminous sofa cup holder of claim 1, wherein a fan is disposed underneath the cooling/heating module.

13. The luminous sofa cup holder of claim 1, wherein the light source comprises a plurality of light emitting diodes.

14. The luminous sofa cup holder of claim 13, wherein a control circuit controls the number of lighted LEDs according to the detecting signal from the temperature sensor.

* * * * *